Oct. 18, 1960 L. L. FRY 2,956,601
SEED POTATO CUTTER
Filed June 1, 1959 3 Sheets-Sheet 1
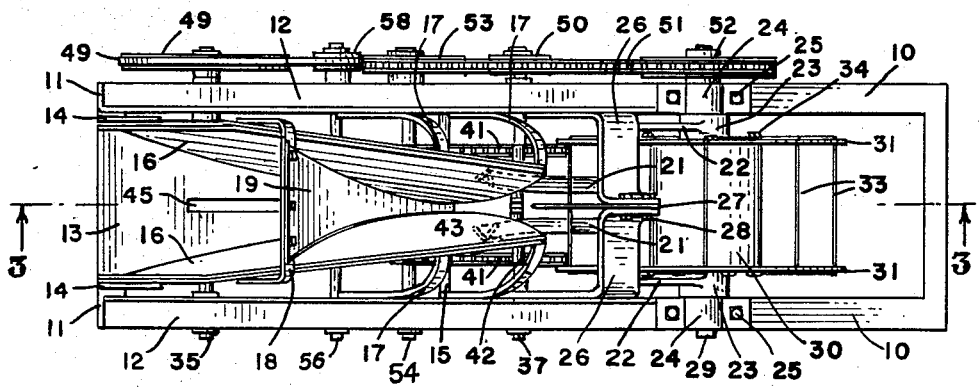
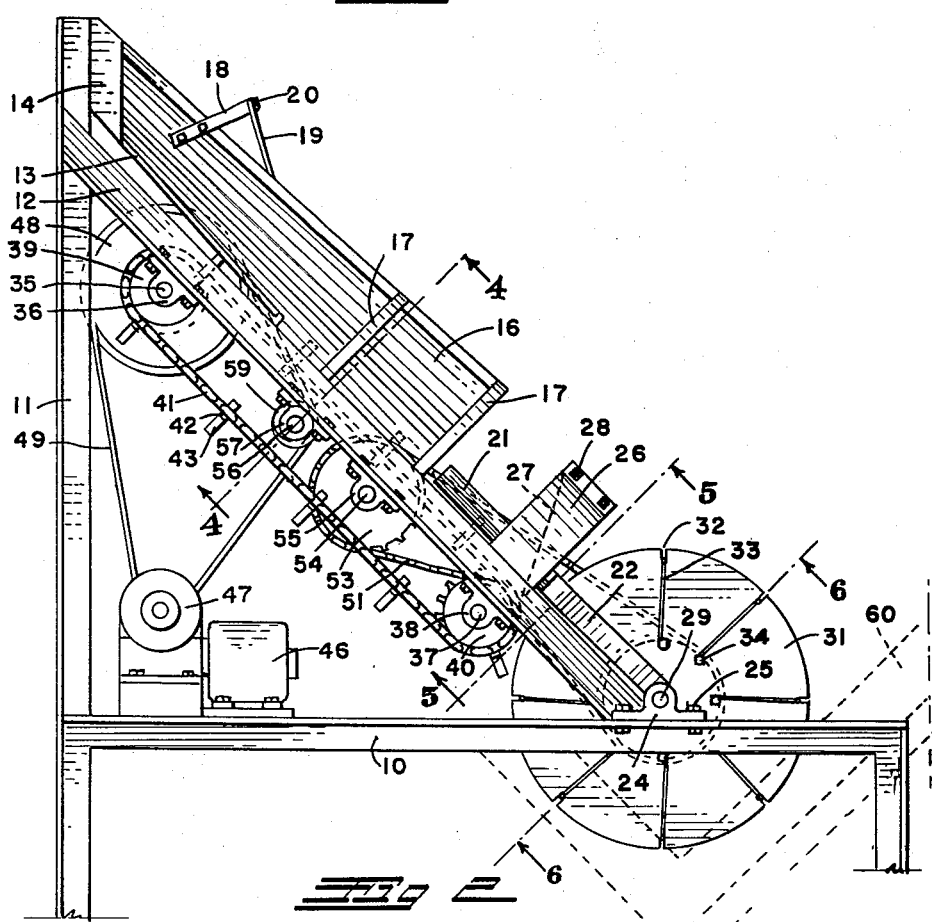
INVENTOR.
LYLE L. FRY
By
ATTORNEY Oct. 18, 1960 L. L. FRY 2,956,601
SEED POTATO CUTTER
Filed June 1, 1959 3 Sheets-Sheet 2
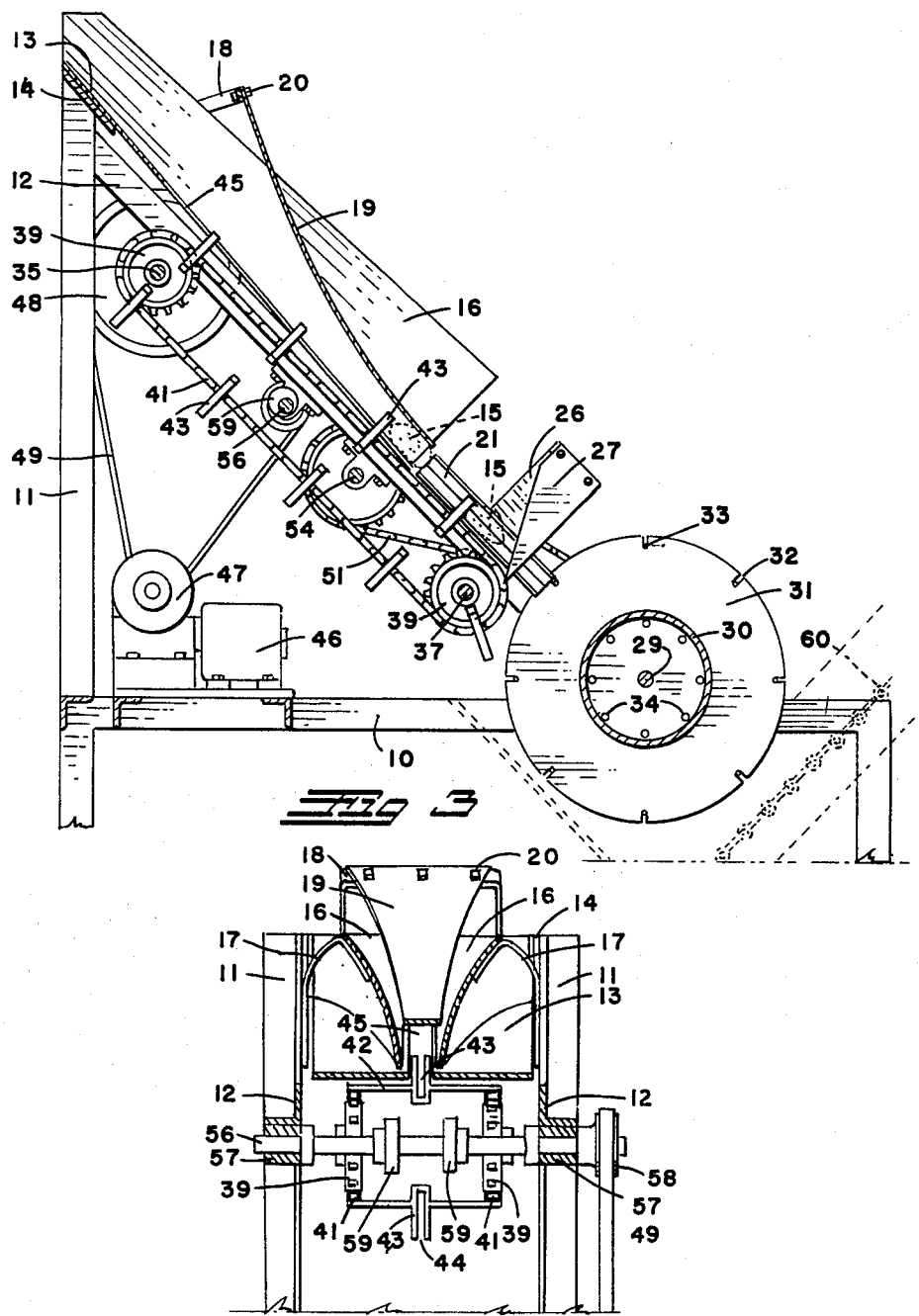
INVENTOR.
LYLE L. FRY
BY
ATTORNEY Oct. 18, 1960 L. L. FRY 2,956,601
SEED POTATO CUTTER
Filed June 1, 1959 3 Sheets-Sheet 3
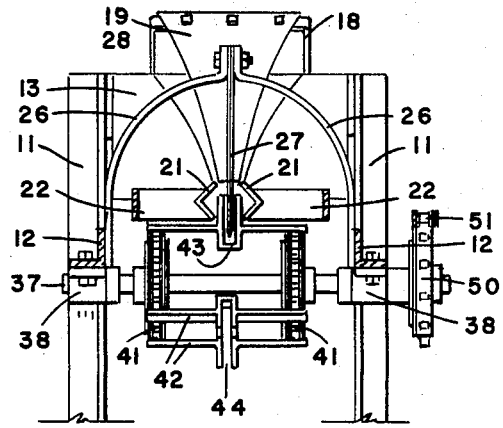
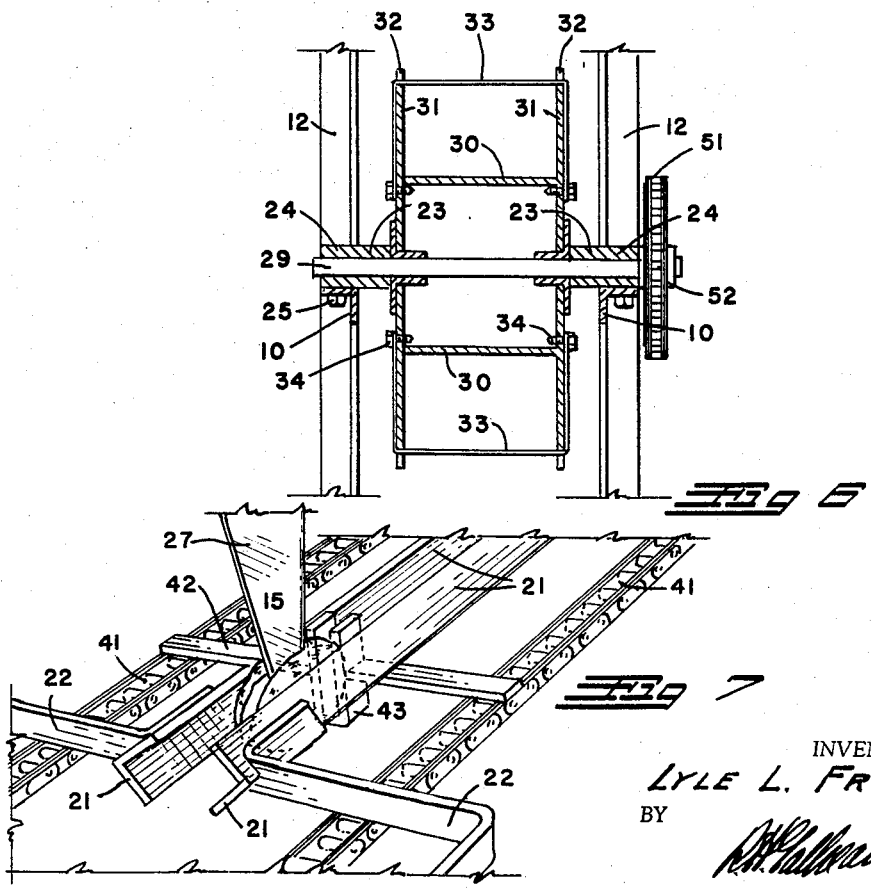
INVENTOR.
LYLE L. FRY
BY
ATTORNEY

United States Patent Office 2,956,601
Patented Oct. 18, 1960

2,956,601

SEED POTATO CUTTER

Lyle L. Fry, Gering, Nebr., assignor to Lockwood Graders, Gering, Nebr.

Filed June 1, 1959, Ser. No. 817,252

3 Claims. (Cl. 146—78)

This invention relates to a seed potato cutting machine. It is common practice to cut seed potatoes into a plurality of parts so as to reduce the cost of seed. The parts are then planted and each part having an eye will grow to produce a potato plant.

The principal object of this invention is to provide a highly efficient machine for accurately cutting seed potatoes into a plurality of parts which will have an exceedingly great capacity and which will operate substantially automatically to cut the potatoes both longitudinally and transversely.

Another object of the invention is to so construct the machine that a minimum of manual attention will be required and to provide a machine which will accommodate potatoes of various sizes and shapes so as to reduce the necessity for prior sizing and grading.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the cutting portion of the improved potato cutting machine;

Fig. 2 is a side view thereof;

Fig. 3 is a longitudinal section thereof taken on the line 3—3, Fig. 1;

Figs. 4, 5 and 6 are inclined, detail cross sections taken on the lines 3—3, 4—4, and 6—6, Fig. 2 respectively;

Fig. 7 is a fragmentary, detail, perspective view showing the elements of the machine making a longitudinal cut in a potato.

The improved potato cutter is supported upon a substantially rectangular base frame 10, preferably, but not necessarily, formed of welded angle irons. Two vertical angle iron posts 11 arise from the rear extremity of the base frame 10 and two inclined angle members 12 incline forwardly and downwardly from the posts 11 to the base frame 10 on an angle of substantially 45°.

A U-shaped yoke member 14 extends between the upper extremities of the posts 11 and an inclined chute bottom plate 13 is attached thereto and extends forwardly and downwardly therefrom. Two opposed, curvated chute side plates 16 are secured at their upper extremities to the sides of the yoke member 14 and extend forwardly and downwardly upon the upper surface of the bottom plate 13. The side plates 16 are arcuately curved as to flare outwardly from each other as their upper edges are approached and are positioned so as to approach each other as they extend forwardly. The bottom plate 13 is provided with a medially positioned slot 45 for the passage of a U-shaped pusher clip 43 which will be later described. The above described plates form a feed chute for feeding potatoes to the cutting mechanism to be later described.

The lower extremities of the two side plates are resiliently braced by means of curved spring bracket arms 17 which are welded or otherwise secured to the upper edges of the side plates 16 and which arch outwardly and downwardly to fixed mountings on the inclined angle members 12 at their lower extremities. This construction resiliently supports the lower extremities of the side plates 16 so that they can be resiliently forced apart.

An inverted U-shaped bracket bar 18 is secured to the side plates in any desired manner and extends upwardly and across therebetween. A triangular, flexible chute top plate 19 is secured at its rear extremity to the bracket bar 18 in any desired manner, such as by means of suitable attachment bolts 20, and extends flexibly forward and downward between the side plates 16. The lower apex extremity of the chute top plate 19 can be resiliently lifted and, when released, will normally return to a position on the bottom plate 13.

A pair of resiliently supported guide angles 21 are positioned substantially in alignment with, and below the lower extremities of the bottom plate 13 and the side plates 16 to receive potatoes, as indicated at 15, from the latter. The guide angles are positioned at 45° angles with their channels facing each other so as to partially enclose a potato when the latter is forced therebetween. The guide angles 21 are supported upon the rear extremities of flexible spring arms 22. The forward extremities of the spring arms 22 are welded or otherwise secured to sleeves 23 fixedly formed on and extending inwardly from shaft bearings 24 mounted on the base frame 10 by means of suitable attachment bolts 25. The spring arms 22 enable the guide angles 21 to be resiliently forced apart by potatoes passing therebetween and will constantly urge the guide angles into opposed frictional engagement with the sides of the potato.

An inverted, L-shaped, knife-supporting arch member 26 is welded or otherwise mounted on the inside of each of the inclined angle members 12, and a sharpened, downwardly depending, triangular-shaped knife blade 27 is clamped between the upper extremities of the two arch members 26 at the center line of the machine by means of suitable knife clamp bolts 28.

A cutter shaft 29 is rotatably mounted in the shaft bearings 24 and extends therebetween. A cutter drum 30, having enlarged circular side discs 31, is affixed to the shaft 29 between the bearings 24. The peripheries of the two side discs 31 of the cutter drum 30 contain equally-spaced and transversally aligned notches 32 and steel piano wires 33 are positioned in the notches so as to extend transversally between the peripheries of the two discs 31 at uniformly spaced intervals. The extremities of the wires 33 are secured to the discs 31 by means of suitable tension screws 34 threaded into the drums 31 by means of which the wires are maintained in a taut condition.

An upper conveyor shaft 35 is journalled in suitable bearings 36 below and adjacent the upper extremities of the inclined angle members 12 and a lower conveyor shaft 37 is journalled in similar bearings 38 below and adjacent the lower extremities of the inclined angle members 12. A pair of upper conveyor chain sprockets 39 are fixedly mounted in spaced relation on the upper conveyor shaft 35 and a similar pair of similarly spaced lower conveyor chain sprockets 40 are fixedly mounted on the lower conveyor shaft 37. An endless conveyor chain 41 extends between the sprockets 39 and 40 at each side of the center line of the machine.

A plurality of parallel, uniformly spaced cross bars 42 are secured at their extremities to the two chains 41 and extend therebetween at right angles to the direction of travel of the chains. The U-shaped pusher clips 43 are welded or otherwise formed in the middle of each cross bar 42. The clips 43 extend both upwardly and downwardly from the cross bars 42 and each is provided with a vertically-opening knife clearance slot 44. During operation, the clips 43 travel downwardly in the medial slot 45 in the chute bottom plate 13 between the two chute side plates 16 thence between the two guide angles 21 and upon both sides of the knife blade 27.

The above described mechanism may be driven in any suitable manner. As illustrated, it is driven from an electric motor 46 through the medium of a conventional speed reducer 47. Rotation is imparted from the speed reducer 47 to a relatively large V-belt pulley 48 affixed on the upper conveyor shaft 35, through the medium of an endless V-belt 49, in a direction to cause the upper reaches of the conveyor chains 41 to travel downwardly. The lower conveyor shaft 37 is rotated through the medium of the conveyor chains 41 and the latter shaft is provided with a terminal sprocket 50 which engages beneath the lower reach of a transmission chain 51. The transmission chain 51 is trained about a terminal drive sprocket 52 on the cutter drum shaft 29 and about an idler sprocket 53 mounted on the extremity of an idler shaft 54 which is journalled in suitable bearings 55 secured below the inclined angle members 12. The position of the terminal sprocket 50 on the outside of the chain 51 causes the cutter drum 30 to rotate in a direction opposite to the direction of rotation of the conveyor sprockets 39 and 40.

A vibrator shaft 56 is journalled in suitable bearings 57 beneath the two inclined angle members 12 and extends transversally beneath the bottom plate 13 terminating in a belt pulley 58 about which the V-belt 49 is trained. The vibrator shaft 56 is provided with any suitable mechanism to impart vibration to the chute bottom plate 13 and the chute side plates 16. As illustrated, it is provided with weighted eccentric cams 59 which, when rotated through the medium of the V-belt 49, impart a vibration to the entire inclined structure.

*Operation*

Potatoes are fed onto the upper extremity of the chute bottom plate 13 in any desired manner such as by means of a suitable feed conveyor. The potatoes roll and slide down the chute bottom plate 13 between the side plates 16 and beneath the flexible top plate 19. Long potatoes, assisted by the resilient pressure of the side plates 16, the resilient pressure of the top plate 19 and the vibration imparted from the vibrator shaft 56, will assume a position in alignment with the axis of the machine. The downwardly traveling pusher clips 43 will contact and force the potatoes between the side plates 16, forcing the latter outwardly, and beneath the top plate 19, forcing the latter upwardly. The resilient pressure of the latter plates will align the potatoes with the guide angles 21. The clips 43 force the potatoes between the guide angles 21, urging the latter oppositely outward against the resiliency of the spring arms 22, and past the knife blade 27. As they pass the knife blade, the potatoes will be split longitudinally into two substantially equal halves, as shown in Fig. 7. The two halves will continue forwardly until they protrude beyond the forward extremities of the guide angles 21 and into the descending path of the piano wires 33. The latter wires will pass downwardly through the two halves as the latter move forwardly to sever the two halves on an inclined transverse cut to form quarters. However, if the potatoes are exceedingly long, a second piano wire may descend as they exit making a second transverse cut to form sixths. The seed potato portions will fall into any suitable receiver such as a conventional elevating conveyor, as indicated in broken line at 60.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A seed potato cutter comprising: a stationary, substantially vertical knife blade; guide means guiding potatoes longitudinally past said blade; pusher means pushing said potatoes longitudinally of said guide means toward the discharge extremity of the latter so as to split said potatoes in said blade; a rotatable wire supporting member positioned at each side of said guide means at the discharge extremity of the latter; cutting wires extending between said wire supporting members across the path of the discharging potatoes; and power means simultaneously actuating said pusher means and said wire supporting members so that said wires will sever said potatoes transversally as they exit from said guide members.

2. A seed potato cutter as described in claim 1 in which the wire supporting members comprise two spaced-apart circular discs having wire receiving notches in their peripheries, said wires positioned in said notches and extending between and at right angles to said discs.

3. A seed potato cutter comprising: an inclined chute bottom plate adapted to receive the potatoes to be cut; side plates upon said bottom plate, said side plates approaching each other so as to urge the potatoes medially as the lower extremity of the bottom plate is approached; resilient means bracing said side plates; two oppositely positioned channeled angle guide members having their channels facing inwardly, said guide members being positioned below and in alignment with said chute so that potatoes discharging from the latter will be received between said guide members so as to be supported by the channels of the latter; means resiliently urging said channels toward each other; two spaced-apart circular discs having wire receiving notches in their peripheries; piano wires positioned in said notches and being stretched between said discs as spaced intervals to sever the potatoes transversally as they exit from said guide members; a fixed knife blade extending downwardly between said guide members to split the potatoes as they travel longitudinally of said guide members; two parallel, traveling, endless chains, one chain being positioned on each side of the longitudinal center line of said bottom plate; cross bars extending between said chains at spaced intervals; and pusher clips carried at the midpoint of said cross bars and extending upwardly between said side plates and arranged to push potatoes between said side plates, between said guide members, past said knife blade and into the path of said piano wires; and means for supplying power to said conveyor chains and to said piano wire discs.

References Cited in the file of this patent

UNITED STATES PATENTS

| | | |
|---|---|---|
| 1,799,638 | Paulson | Apr. 7, 1931 |
| 2,450,583 | Crozier | Oct. 5, 1948 |